(12) United States Patent
Sze et al.

(10) Patent No.: US 7,685,396 B2
(45) Date of Patent: Mar. 23, 2010

(54) SYSTEM AND METHOD FOR DYNAMIC MEMORY ALLOCATION

(75) Inventors: David P. Sze, Kitchener (CA); Salmaan Ahmed, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 371 days.

(21) Appl. No.: 11/681,838

(22) Filed: Mar. 5, 2007

(65) Prior Publication Data

US 2008/0222380 A1    Sep. 11, 2008

(51) Int. Cl.
G06F 12/00 (2006.01)
(52) U.S. Cl. .................. 711/170; 711/100; 711/103; 711/171; 707/205; 707/206
(58) Field of Classification Search .......... 711/100, 711/103, 105, 111, 154, 170–171; 707/205–206
See application file for complete search history.

(56) References Cited

U.S. PATENT DOCUMENTS 6,757,802 B2 *   6/2004   Trainin et al. ............... 711/170
2006/0069898 A1 *  3/2006   Patel et al. .................. 711/171

OTHER PUBLICATIONS

Donald Knuth, "Fundamental Algorithms Section 2.5: Dynamic Storage Allocation", Third Edition, Addison-Wesley, 1997, ISBN 0-201-89683-4, pp. 435-456.

Wilson et al., "Dynamic Storage Allocation: A Survey and Critical Review", Memory Management International Workshop IWMM Proceedings, 1995, pp. 1-78, XP002262845.

Rezaei et al., A New Implementation Technique for Memory Management, Internet Article, Online, Apr. 9, 2000, URL:http://ieeexplore.ieee.org/ie15/6808/18269/00845587.pdf, XP002431173.

Rezaei et al., "Utilization of Separate Caches to Eliminate Cache Pollution Caused by Memory Management Functions", Internet Article, Online, 2003, URL: http://csrl.unt.edu/lkavi/Research/pdcs2003-110.pdf, XP002431174.

(Continued)

*Primary Examiner*—Jasmine Song
(74) *Attorney, Agent, or Firm*—Shin Hung; Borden Ladner Gervais LLP

(57) ABSTRACT

A method for managing the allocation of memory to one or more applications. The method includes allocating a variety of fixed size memory blocks to a requesting application, each of the fixed size memory blocks being free of header information to maximize memory usage. Free, or unused blocks of data of the same fixed size are maintained in a freelist having a number of block roots corresponding to the number of differently fixed size memory blocks. Each block root stores a root pointer to an unused memory block previously allocated to the application. To conserve memory, each unused memory block will store branch pointers to other identically sized unused memory blocks, thereby forming a sequential chain of unused memory blocks with the block root. Therefore, applications requesting the same sized memory block can re-use previously allocated fixed size memory blocks.

29 Claims, 14 Drawing Sheets

OTHER PUBLICATIONS

Comfort et al. IBM Corporation, "Multiword list items", Communication of the ACM, vol. 7, No. 6, 1964, p. 357-361, XP002431277.

Chang et al., "Measuring dynamic memory invocation in object-oriented programs", Performance, Computing and Communications Conference, 1999 IEEE International, Feb. 10-12, 1999, pp. 268-274, XP010323644.

Jones, "Chapter 14, Dynamic Storage Allocation Heap management for linked data structures", Internet Article, 2004, URL: http://www.cs.uiowa.edu/ljones/syssoft/notes/14alloc.html, 002431199.

Garner, "JMTk: A portable memory management toolkit", Internet Article, 2003, URL: http://dspace.anu.edu.au/bitstream/1885/39952/4/thesis,ps, XP002431244.

* cited by examiner

SYSTEM AND METHOD FOR DYNAMIC MEMORY ALLOCATION

FIELD OF THE INVENTION

The present invention relates generally to dynamic memory allocation. More particularly, the present invention relates to dynamic memory allocation schemes.

BACKGROUND OF THE INVENTION

Wireless mobile devices, including personal digital assistants (PDA's) and mobile phones, have a multitude of functions ranging from voice and data communications to Internet browsing. Data communications can include text messaging or email, while Internet browsing can include viewing news websites.

While many wireless mobile devices have voice communication capabilities, wireless text messaging and e-mail are becoming a preferred means of communication. Furthermore, users are constantly demanding the ability to browse the Internet wirelessly on their mobile devices. Hence, news media, entertainment listings, and virtually any content on the Internet should be viewable from the mobile device. Such rich content requires buffering, or storage, which is provided by the on-board memory, such as memory 22, in the mobile device.

Unfortunately, the consumer demand for minimally sized mobile devices constrains the amount of memory which can be included in a mobile device. For example, some mobile devices are limited to 16 MB of on-board memory, some of which may be allocated for running software applications, while the remaining portion is dedicated for storing data. Although modern personal computers (PC) can have 2 gigabytes of dynamic memory, the high number of concurrent processes and applications run by the PC can quickly consume the available memory, and if inefficiently used, can degrade system performance.

Fortunately, text data in email messages, documents and web pages, can be compressed using lossless compression schemes in order to alleviate memory demand, and reduce transmission time of the data to and from a base station. One example of such text compression is the YK compression algorithm disclosed in U.S. Pat. No. 6,801,141 (Yang). Generally, the YK compression algorithm identifies longest prefix string matches in the document or page to be compressed, and replaces instances of repeating strings with a variable. The relative location of the variables are recorded, and storage of the compressed document can accordingly use less memory than the uncompressed document. The YK compression algorithm is but one compression scheme which can be used. Those skilled in the art will understand that there are different text compression algorithms which can be used.

Most applications, including compression schemes such as the YK compression algorithm, will need memory space to perform its functions. This memory can include static memory, transient memory and dynamic memory. Static memory allocation refers to the allocation of memory before the application is executed. Statically allocated memory provides high speed operation, but is generally restrictive, as the size of memory is fixed and unusable by other applications. Transient memory allocation refers to the allocation of memory for buffering information for a short duration of time. Transient memory is typically small, and does not significantly impact memory use relative to the static memory and the dynamic memory. Dynamic memory allocation refers to the allocation of memory while the application is running. Dynamic memory allocation is commonly used since applications will request and use specifically sized portions of memory for executing its functions. Of the listed types of allocated memory, dynamic memory allocation requires careful management to be effectively and efficiently used.

The following discussion herein relates solely to dynamic memory allocation. When memory is dynamically requested, the memory controller will first provide a specific portion of memory, such as a page, for use by the application. The application may then request one or more blocks within the page for storing data, where a block can be a predefined number of bytes or a specific number of requested bytes. When a block is requested by the application, the application will store a value corresponding to the actual size of the block in bytes. The purpose of storing this information is to allow the application to keep track of how much of the space within the allocated block is used up, so that it can request a larger memory block, as the need arises. In the YK compression algorithm for example, the data that needs to be stored can expand, eventually exceeding the capacity of the originally allocated memory block. In such a case, the allocated memory block can be released and a larger sized memory block can be allocated to the application in its place. If it is determined that the full capacity of the allocated memory block will never be used, then the allocated memory block can be released and a smaller memory block can be allocated in its place. Alternatively, the allocated memory block can be augmented by allocating one or more additional memory blocks to the application. FIG. 2 is a conceptual illustration of the typical data structure of a data block dynamically allocated to an application in a page of memory.

FIG. 2 shows a memory page 30 and two allocated blocks 32 and 34 within page 30. By example, the memory page 30 can be 64 k bytes in size. It is assumed in this example that addresses increase from the left side to the right side, and from the top to the bottom of page 30. When the application makes a request for memory having size "A", the memory manager will first ensure that there sufficient room in the page, and then allocate a block having size "A". A pointer, referred to as Pointer[1] for this first block, is returned to the application. Pointer[1] indicates the starting address of the block the application can use. If another request by the application is made for memory having size "B", then a second block having size "B" is allocated, and Pointer[2] is returned to the application. Although the application requests memory having size "A" or "B", additional information is appended to blocks 32 and 34 in the form of headers 36 and 38. Header's 36 and 38 include information regarding the size of the block it is appended to. This header can be 4 bytes long for example, and is considered overhead for the block. Hence, the data structure of an allocated memory has a payload portion for storing data, and a corresponding header portion.

The purpose of the header is now explained. When the application no longer needs either block 32 or 34 previously allocated to it, it will release the block and free it for later use. However, the memory manager must know the size of the block to be freed. Since the memory manager has the pointer to the beginning of the block to be freed, it will read the 4 preceding bytes of data to identify the size of the block. Therefore, the true size of the data block being used in the page 30 is the sum of the size of the requested payload space for storing data and the corresponding header. Accordingly, both the application and the memory manager will store a value corresponding to the size of the memory block. This data structure and general allocation scheme is ideally suited for applications where relatively large blocks of data are requested. For example, a typical application might request many blocks of memory each having a size of 128 bytes, therefore a 4 byte header represents approximately 3% overhead for the payload.

Unfortunately, this data structure is unsuitable for applications which request small blocks of memory, as will be further explained. A characteristic of the YK compression algorithm is the need to store many small blocks of data in a page of memory while executing its compression routine. A small block size can be between 6 bytes and 72 bytes for example. If a large proportion of blocks are 6 bytes in size for example, then a header 4 bytes in size accompanying the payload will contribute 40% overhead for the block. This means that a significant proportion of the page can be dedicated to storing header information, thereby reducing the effective memory available for storing actual data.

The general memory allocation scheme and examples described above assume that a page of memory is empty prior to allocation of memory blocks, which makes memory allocation straight-forward as the memory manager can progressively allocate sequential blocks of memory. An important feature of dynamic memory allocation is the ability to re-allocate freed blocks of memory within the page to one or more other applications. Unfortunately, there are inefficiencies in prior re-allocation schemes which add to the inefficiency of the header-based memory allocation scheme.

For example, the heap-based allocation scheme searches the memory for freed blocks of memory that are large enough to fit the requested block size. This scheme is processor intensive, and will negatively impact the performance of the system. The buddy block scheme maintains a linked list of free blocks, which can be memory intensive as the number of buddy blocks grows. The heap-based allocation scheme and the buddy block allocation scheme are well known in the art, and described in Fundamental Algorithms, Third Edition, Addison-Wesley, 1997, ISBN 0-201-89683-4, Section 2.4: Dynamic Storage Allocation, pp. 435-456, authored by Donald Knuth.

Another inefficiency in most general purpose memory allocation schemes is wasted space, also called internal fragmentation. For example, the buddy block allocation scheme typically manages blocks in sizes that are powers of two. So if the application requests an amount that is not an exact power of two, there is wasted space in the allocated block that will never be used.

Therefore, the available memory is quickly consumed when a large number of small memory blocks are allocated to one or more applications. This can be seen as low memory usage efficiency since a relatively high proportion of the memory may not be used to store application data.

Unfortunately, the application may cease to run if no further memory can be allocated to it. While more memory can be added to the mobile device to alleviate the high rate of memory consumption, the additional cost, increased size and increased power consumption of the device may not be acceptable to the end user.

It is, therefore, desirable to provide a method and system for increasing the memory usage efficiency when dynamically allocating small blocks of memory to one or more applications.

BRIEF DESCRIPTION OF THE DRAWINGS

Embodiments of the present invention will now be described, by way of example only, with reference to the attached Figures, wherein.

DETAILED DESCRIPTION

Figure 1:
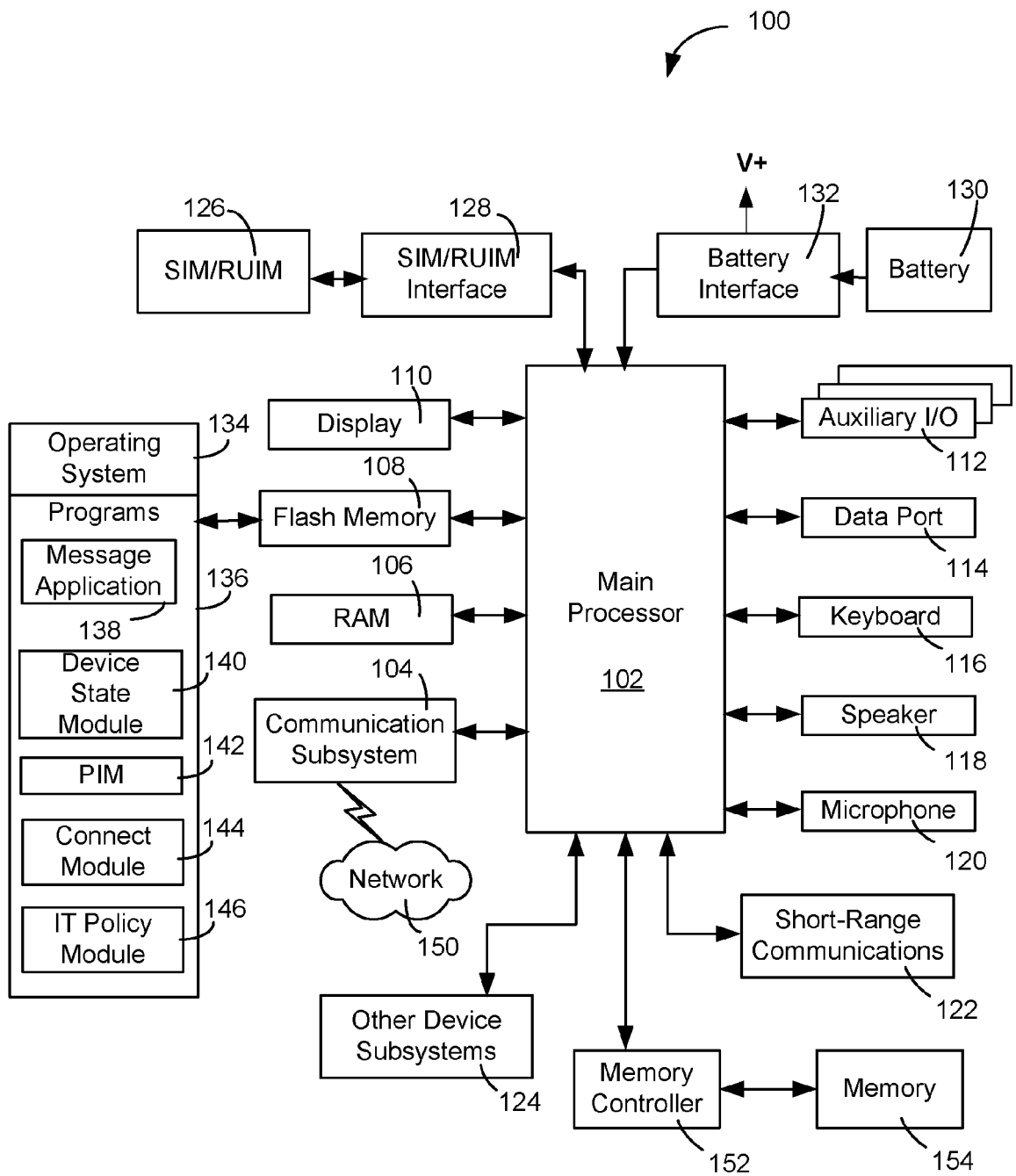
FIG. 1 is a block diagram of an exemplary embodiment of a mobile device.
Figure 2:
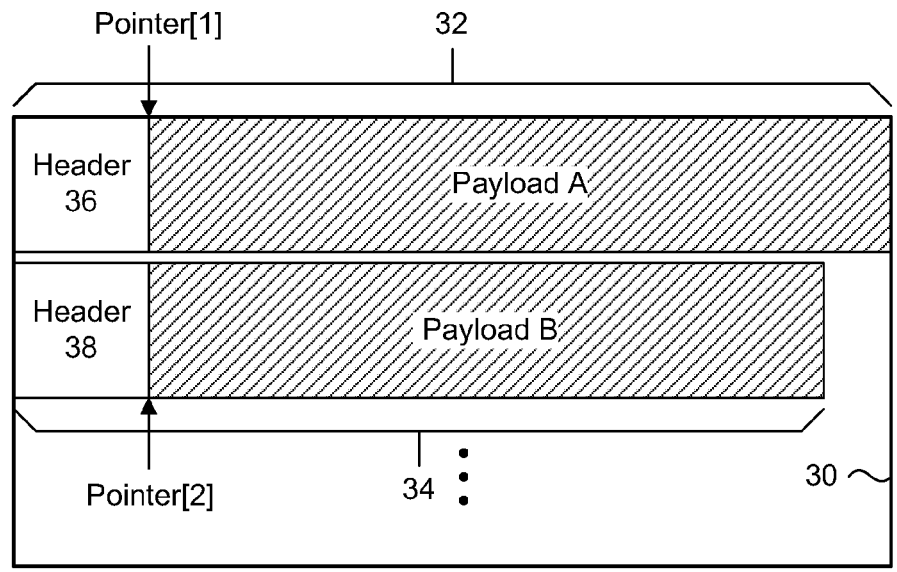
FIG. 2 is a conceptual illustration of the typical data structure of a data block allocated from a page of memory.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The embodiments described herein generally relate to a mobile wireless communication device, hereafter referred to as a mobile device, which can be configured according to an IT policy. It should be noted that the term IT policy, in general, refers to a collection of IT policy rules, in which the IT policy rules can be defined as being either grouped or non-grouped and global or per-user. The terms grouped, non-grouped, global and per-user are defined further below. Examples of applicable communication devices include pagers, cellular phones, cellular smart-phones, wireless organizers, personal digital assistants, computers, laptops, handheld wireless communication devices, wirelessly enabled notebook computers and the like.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device, reference will now be made to FIG. 1.

Referring first to FIG. 1, shown therein is a block diagram of an exemplary embodiment of a mobile device 100. The mobile device 100 includes a number of components such as a main processor 102 that controls the overall operation of the mobile device 100. Communication functions, including data and voice communications, are performed through a communication subsystem 104. The communication subsystem 104 receives messages from and sends messages to a wireless network 150. In this exemplary embodiment of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 150 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 150 associated with mobile device 100 is a GSM/GPRS wireless network in one exemplary implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 150, and device-resident functions such as a calculator or task list.

The mobile device 100 can send and receive communication signals over the wireless network 150 after required network registration or activation procedures have been completed. Network access is associated with a subscriber or user of the mobile device 100. To identify a subscriber, the mobile device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 150. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile device 100 during its manufacture. Other software applications include a message application 138 that can be any suitable software program that allows a user of the mobile device 100 to send and receive electronic messages. Various alternatives exist for the message application 138 as is well known to those skilled in the art. Messages that have been sent or received by the user are typically stored in the flash memory 108 of the mobile device 100 or some other suitable storage element in the mobile device 100. In at least some embodiments, some of the sent and received messages may be stored remotely from the device 100 such as in a data store of an associated host system that the mobile device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 150. PIM data items may be seamlessly integrated, synchronized, and updated via the wireless network 150 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Figure 3:
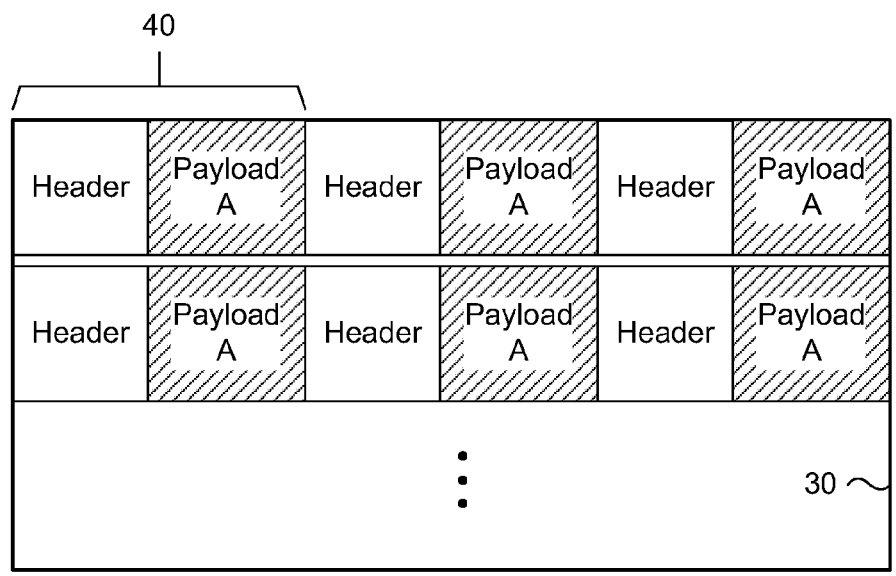
FIG. 3 is an illustration of a memory page with small memory block allocations.

The mobile device 100 also includes a connect module 144, and an IT policy module 146. The connect module 144 implements the communication protocols that are required for the mobile device 100 to communicate with the wireless infrastructure and any host system, such as an enterprise system, that the mobile device 100 is authorized to interface with. Examples of a wireless infrastructure and an enterprise system are given in FIGS. 3 and 4, which are described in more detail below.

The connect module 144 includes a set of APIs that can be integrated with the mobile device 100 to allow the mobile device 100 to use any number of services associated with the enterprise system. The connect module 144 allows the mobile device 100 to establish an end-to-end secure, authenticated communication pipe with the host system. A subset of applications for which access is provided by the connect module 144 can be used to pass IT policy commands from the host system to the mobile device 100. This can be done in a wireless or wired manner. These instructions can then be passed to the IT policy module 146 to modify the configuration of the device 100. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 106 in its native form. After the IT policy data is stored, a global notification can be sent by the IT policy module 146 to all of the applications residing on the mobile device 100. Applications for which the IT policy may be applicable then respond by reading the IT policy data to look for IT policy rules that are applicable.

The IT policy module 146 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 146 can determine which applications are affected by the IT policy data and send a notification to only those applications. In either of these cases, for applications that aren't running at the time of the notification, the applications can call the parser or the IT policy module 146 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 146 sends an acknowledgement back to the host system to indicate that the IT policy data was received and successfully applied.

Other types of software applications can also be installed on the mobile device 100. These software applications can be third party applications, which are added after the manufacture of the mobile device 100. Examples of third party applications include games, calculators, utilities, etc.

The additional applications can be loaded onto the mobile device 100 through at least one of the wireless network 150, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network 150. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 150 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

The mobile device of FIG. 1 further includes a memory controller 150 and a memory 152. One function of memory controller 150 is to allocate portions of memory 152 to the main processor 102, upon request by an application. Memory 152 can be used for dynamic, static and transient data storage, and can be implemented as volatile memory, such as dynamic random access memory (DRAM) or static random access memory (SRAM).

Generally, the dynamic memory allocation embodiments provide a method and system for managing the allocation of memory to one or more applications. The header-less dynamic memory allocation architecture includes a method of allocating differently fixed size memory blocks to a requesting application, each of the fixed size memory blocks being free of header information to maximize memory usage. Free, or unused memory blocks released by the application, having the same fixed size are maintained in a freelist. The freelist has a number of block roots corresponding to the number of differently fixed size memory blocks. Each block root stores a root pointer to a free memory block previously allocated to the application. To conserve memory, each unused memory block will store branch pointers to other identically sized unused memory blocks, thereby forming a sequential chain of unused memory blocks with the block root. Therefore, applications requesting the same sized memory block can re-use previously allocated fixed size memory blocks.

The embodiments of the dynamic allocation system and method are particularly suited for applications that request the same fixed size memory blocks within a range of quantized sizes with high frequency. By re-using previously allocated fixed size memory blocks, fragmentation can be minimized while high utilization of the memory can be achieved.

In accordance with the teachings provided herein, a system and method is provided for dynamic memory allocation that reduces memory usage storage overhead.

As an example, the memory allocation system includes a memory having a page for storing data and a small block memory manager. The small block memory manager can allocate a plurality of fixed size memory blocks free of header information in the page in response to an application request for memory less than or equal to a maximum block size. The small block memory manager can maintain a freelist of fixed block sizes up to the maximum block size. The system can include a large block memory manager for allocating memory in the page according to a standard memory allocation scheme in response to the application request for memory greater than the maximum block size.

In another example, the method for dynamic allocation of memory in a page can include initializing a freelist having a plurality of block roots each corresponding to a plurality of fixed size memory blocks, receiving a request for memory of a predetermined size, and allocating a memory block having a size corresponding to one of the plurality of fixed size memory blocks in the page if the predetermined size is less than or equal to a largest fixed size block of the plurality of fixed size blocks.

An example of a dynamic memory allocation architecture can be one which includes a memory page and a freelist. The memory page can be subdividable into differently fixed size memory blocks free of header information in response to a memory request. Each of the differently fixed size memory blocks can store one of application data and a first pointer. The freelist can contain a plurality of block roots, where each of the plurality of block roots corresponds to one of the differently fixed size memory blocks. Each of the plurality of block roots can store one of a null pointer and a second pointer pointing to one fixed size memory block storing the first pointer.

Figure 4:
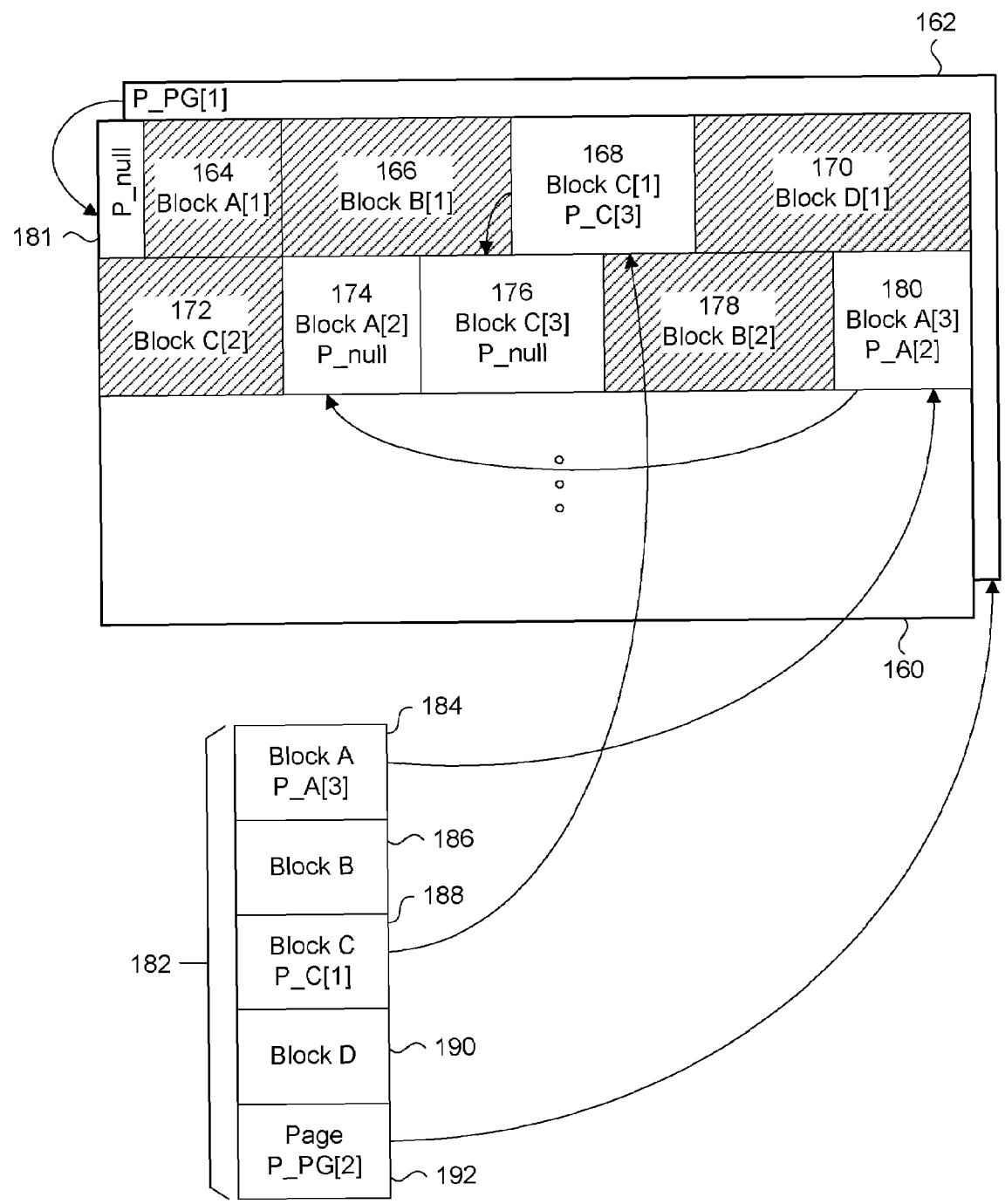
FIG. 4 is a conceptual illustration of the header-less dynamic memory allocation architecture, according to a present embodiment.

FIG. 4 is a conceptual illustration of an embodiment of the dynamic memory allocation architecture after one or more applications have requested blocks of memory. The physical memory available to a mobile device, or any device using memory, can be logically divided into one or more memory pages, such as memory pages 160 and 162. In the following discussion, only memory page 162 will be described in detail.

Memory page 160 represents the memory space available for use by one or more applications running on the device. After a number of memory block requests, the memory page 160 will be subdivided into a plurality of memory blocks, such as memory blocks 164, 166, 168, 170, 172, 174, 176, 178 and 180 for example. Hence, the memory page 160 can include allocated blocks in use by the application, previously allocated memory blocks released by the application, and un-allocated memory space. Each of the memory blocks have predetermined sizes, and there are a limited number of different predetermined sizes which can be allocated. Each of the memory blocks is header-free, meaning that there is no additional overhead information appended to the memory block. Therefore, an allocated memory block of a predetermined size will occupy exactly that predetermined size in memory page 160. In the presently shown example, there are four different block sizes. These are referred to as Block A, Block B, Block C and Block D. The numeral in square brackets indicates an instance of a particular block size in memory page 160. For example, memory blocks 164, 174 and 180 are all Block A memory blocks. A reserved area in memory page 160 is page pointer block 181, which is used to store pointer information to another memory page. Further details of this feature will be discussed later.

The other component of the header-less dynamic memory allocation architecture of the present embodiment is the freelist 182. The freelist 182 is a set of all the predetermined block sizes available for allocation to the application, and maintains a list of all memory blocks of the same size that are released/freed by the application for subsequent allocation. For example, the predetermined block sizes can be preset to be integer multiples of a unitary block size, where the unitary block size can be any number of bytes. If m is a unitary block of bytes, then one set of predetermined block sizes can have linearly increasing block sizes: 1 m, 2 m, 3 m, 4 m etc. Alternatively, the set of predetermined block sizes can have geometrically or exponentially increasing block sizes. While the predetermined block sizes can follow a mathematical pattern based on a unitary block size, the block sizes can be determined from test analysis of most commonly requested block sizes requested by an application, thereby resulting in a distribution of block sizes having any number of bytes. In the case where more than one page of memory is allocated, freelist 182 can maintain a list of all memory pages that have been allocated to the application. In an alternate embodiment, a separate page linked list can be used for storing a pointer to the first memory page. The freelist 182 is stored in another area of memory, and has a fixed size. In one embodiment, the freelist 182 can be stored in static memory since the size of the freelist 182 will be known and fixed upon initialization of the application. Using the current example where there are four different block sizes available, freelist 182 will consist of four block roots 184, 186, 188 and 190, each corresponding to block sizes Block A, Block B, Block C and Block D respectively. Each block root stores either a null pointer or a root pointer. A null pointer indicates that there are no free blocks corresponding to that block size, while root pointer points to a free block in memory page 160.

The relationship between the memory blocks of memory page 160 and freelist 182 is now described. Each memory block in memory page 160 stores application data when in use by the application, or a pointer when released by the application. Application data is strictly used by the application which requested the memory block. The pointer in the memory block can be either a null pointer, meaning that there are no further free blocks corresponding to that block size, or a branch pointer. A branch pointer points to a location of the next free memory block having the same size. If a free block stores a branch pointer, then there will be a pointer to this free block stored in the block root or another free block. Therefore, a sequential linked-list chain of pointers from the block root to any number of free blocks in memory page 160 can be formed.

The function of page root 192 differs somewhat from the above-described block roots. The purpose of page root 192 is to maintain a linked list of memory pages that have been allocated by the memory manager, thereby allowing it to free the memory pages when the application is finished and un-initializes the memory manager. According to an embodiment, page root 192 will store a page pointer pointing to the most recently allocated memory page. This most recently allocated memory page can include either a null pointer indicating that there are no further allocated memory pages, or a branch pointer pointing to a previously allocated memory page. Therefore, a sequential linked-list chain of pointers from the page root to any number of memory pages can be formed.

If overall memory usage by the device reaches a maximum predetermined threshold, one or more memory pages allocated to the application can be released. It should be noted that the application, by default, will always retain one memory page. The memory manager can execute a page release algorithm to first verify that all memory blocks in the memory page are in the freelist 182 before releasing the memory page. Those skilled in the art will understand that different techniques can be used for verifying an "empty" memory page. For example, the application can be queried to return at least one pointer to a memory block in use in the target memory page. The presence of at least one pointer indicates that the memory page is in use, otherwise, no data is being stored in the target memory page. The freelist can then be updated to remove released memory blocks residing in the target memory page for preventing re-allocation to the target memory page. The linked list of page pointers can be then be updated to reflect the removal of the target memory page.

Using the current example shown in FIG. 4, it is assumed that memory blocks 168, 174, 176 and 180 are released during the operation of the application. Since memory blocks 174 and 180 are both Block A in size, they will be linked to block root 184. In this example, block root 184 stores root pointer P_A[3], which points to the location of memory block 180 in memory page 160. Memory block 180 in turn will store branch pointer P_A[2], which points to the location of memory block 174 in memory page 160. Memory block 174 in turn will store a null pointer as there are no further free blocks of the same size. Similarly, block root 188 stores root pointer P_C[1], which points to the location of memory block 168. Memory block 168 in turn will store branch pointer P_C[3], which points to the location of memory block 176 in memory page 160. Finally, memory block 176 in turn will store a null pointer as there are no further free blocks of the same size.

With regard to the page root 192, it will initially store pointer P_PG[1] to memory page 160. If new memory page 162 is allocated, as is shown in FIG. 4, then page root 192 will store pointer P_PG[2] to memory page 162. Memory page 162 will then store a branch pointer P_PG[1] to memory page 160 in page pointer block 181, and the page pointer block 181 of memory page 160 will store the null pointer P_null. The page pointer block 181 can be stored within the first several bytes at the beginning of the memory page.

An immediately seen advantage of the dynamic memory allocation architecture embodiment is the minimized fragmentation of memory page 160. If the application tends to use the same sized memory block with high frequency, then previously allocated memory blocks can be re-used. Another advantage is the re-use of the freed memory blocks for maintaining the freelist of released memory blocks, by storing pointers to subsequent free memory blocks. This means that the freelist itself will never be burdened with storing a growing number of pointers, as the pointers are stored in memory page 160.

Figure 5:
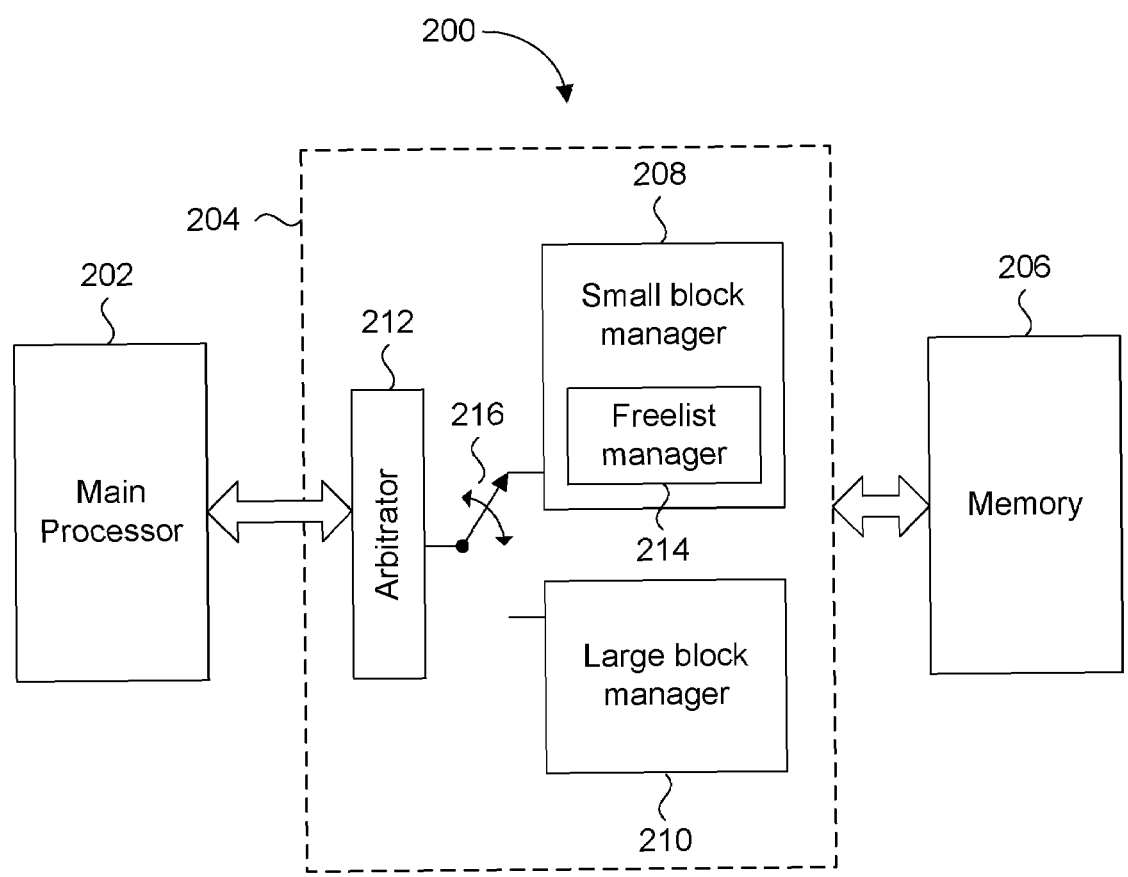
FIG. 5 is a block diagram of a memory manager for implementing the header-less dynamic memory allocation architecture, according to present embodiment.

Now having described the aspects of the header-less dynamic memory allocation architecture, following will be a discussion of the components in the mobile device and their function in the dynamic memory allocation architecture according to one embodiment. FIG. 5 is a block diagram of some of the components of a mobile device 200 configured for the dynamic memory allocation architecture, according to one embodiment. Mobile device 200 can generally correspond to mobile device 100 shown in FIG. 1, with many of the previously shown components omitted in order to simplify the drawing.

Mobile device 200 includes a main processor 202, a memory manager 204, and memory 206. Main processor 202 executes application programs that request memory from memory 206, store and read data from memory 206, and release unused memory to the system. Depending on the application, requested memory can be a specific number of bytes, or can be one of a number of predetermined differently sized blocks of memory. The application can be configured to request these fixed size memory blocks. Memory manager 204 is generally responsible for managing data being written to and read from memory 206. Of course, memory manager 204 is further responsible for allocating memory pages and memory blocks to the applications and for keeping track of free blocks of memory.

According to an embodiment of the dynamic memory allocation system, memory manager includes a small block manager 208, a large block manager 210 and a block request arbitrator 212. Small block manager 208 includes a freelist manager 214. Small block manager 208, large block manager 210 and block request arbitrator 212 can be executable software/firmware algorithms. In the presently shown embodiment, requests for memory sized below or equal to a predetermined threshold, will be controlled by the small block manager 208, while requests for memory sized above the predetermined threshold are controlled by the large block manager 208. The predetermined threshold can be set to a value based on testing of the application and statistical analysis of memory block requests by the application. For example, the threshold can be selected such that the most commonly requested block sizes are less than the threshold. Since this threshold can be related to the predetermined set of block sizes, the selection of the threshold can be for example, an optimal balance between minimizing the size of the corresponding freelist and maximizing requests for the predetermined block sizes by the application. As previously discussed, the freelist is stored in static memory, hence minimizing the number of block roots of the freelist will reduce static memory consumption. The block request arbitrator 212 is responsible for determining which manager to use in response to the memory request from the application. This is done by forwarding the memory request to one of the two memory managers 208 and 210. A switch circuit 216 connected to block request arbitrator 212 conceptually illustrates the selection function of block request arbitrator 212.

If the memory being requested is below the predetermined threshold, then the small block manager 208 will allocate memory in accordance with the dynamic memory allocation architecture shown in FIG. 4. Preferably, the predetermined threshold is set based on some previous knowledge of the memory request patterns of one or more applications run by main processor 202. For example, if the YK compression algorithm frequently requests memory between 6 bytes and 72 bytes in size when compressing English language text, then the predetermined threshold can be set to a maximum of 72 bytes. The predetermined threshold can be dynamically set according to the application being run, and in the case of the YK compression algorithm, the specific task. For example, the task may be to compress French language text instead of English language text, hence the predetermined threshold may differ due to characteristics of the language being compressed.

As previously mentioned, the application can request either a specific size of memory, or one of a plurality of fixed size memory blocks. In the present embodiment, small block manager 210 will allocate fixed size memory blocks to the application. If the application requests a specific size of memory, then small block manager 210 can allocate the smallest fixed size memory block that is at least the requested specific size of memory.

The freelist manager 214 is responsible for initializing the freelist, such as freelist 182 in FIG. 4, and in particular the number of block roots and the page root in the freelist. Initializing the freelist can include setting the number of block roots to correspond with the number of fixed size memory blocks that will be used, when an application is initiated. Initializing can including storing the page pointer to the allocated page into the page root 192. The number of fixed size memory blocks, and the size of each fixed size memory block, can be set to correspond with the predetermined threshold, as the predetermined threshold can be set according to the application and/or specific task of the application. This can be referred to as a freelist profile. Upon startup of the application, the freelist manager 214 sets all block roots to store a null pointer, meaning that there are no free blocks having a size corresponding to the block roots. As the application executes, allocated fixed size memory blocks will be released. It is then the responsibility of the freelist manager 214 to coordinate the storage of pointers in the free blocks, and the maintenance of the pointers when free blocks are re-allocated to the application.

On the other hand, if the memory being requested is greater than the predetermined threshold, then the large block manager 210 will allocate memory in accordance with any one of well known memory allocation schemes. Such schemes can include previously described heap-based allocation scheme and the buddy-block allocation scheme, for example.

In the above described embodiment of the freelist, a predetermined number of block roots each corresponding to a different fixed size memory block is initialized upon startup of the application. This can be referred to as a static freelist, which by itself will occupy a specific amount of memory for storing root pointers. If specifically sized memory blocks are never allocated and thus never released to the freelist, then there is no need to have a corresponding block root in the freelist. For a specific task of an application, the memory manager can keep track of the fixed size memory blocks being requested by the application for the duration of the task. For example, the YK compression algorithm may be compressing a CNN webpage and the memory manager determines that six of the fixed size memory blocks are never requested. Therefore, the next time the same or similar CNN webpage is compressed, the memory manager can exclude the block roots corresponding to those six fixed size memory blocks from the freelist. This can be referred to as a dynamic freelist. Should an excluded memory block size be requested by the application, the small block manager 208 can allocate the next larger fixed size memory block that can be allocated, or the block request arbitrator 212 can pass the request to the large block manager 210. Furthermore, the fact that the particular fixed size block has been requested can trigger the memory manager to generate an updated dynamic freelist for the next execution of the application. Accordingly, the block root corresponding to the previously excluded fixed size block can be included in the freelist for use with the next execution of the application.

The present example uses statistical data from a single historical task for generating a dynamic freelist, but any number of historical tasks can be monitored before a dynamic freelist is generated. This can be referred to as a training period for the application, which can be arbitrarily set. Additionally, this historical data can be compiled offline based on testing, and then periodically uploaded to the memory manager. This data can be included in the freelist profile.

Following is a discussion of the operation of the small block manager 208 shown in FIG. 5. Small block manager 208 is responsible for setting up and maintaining the header-less dynamic memory allocation architecture shown in FIG. 4. A flow chart outlining the dynamic memory allocation method according to another embodiment is shown in FIG. 6.

Figure 6:
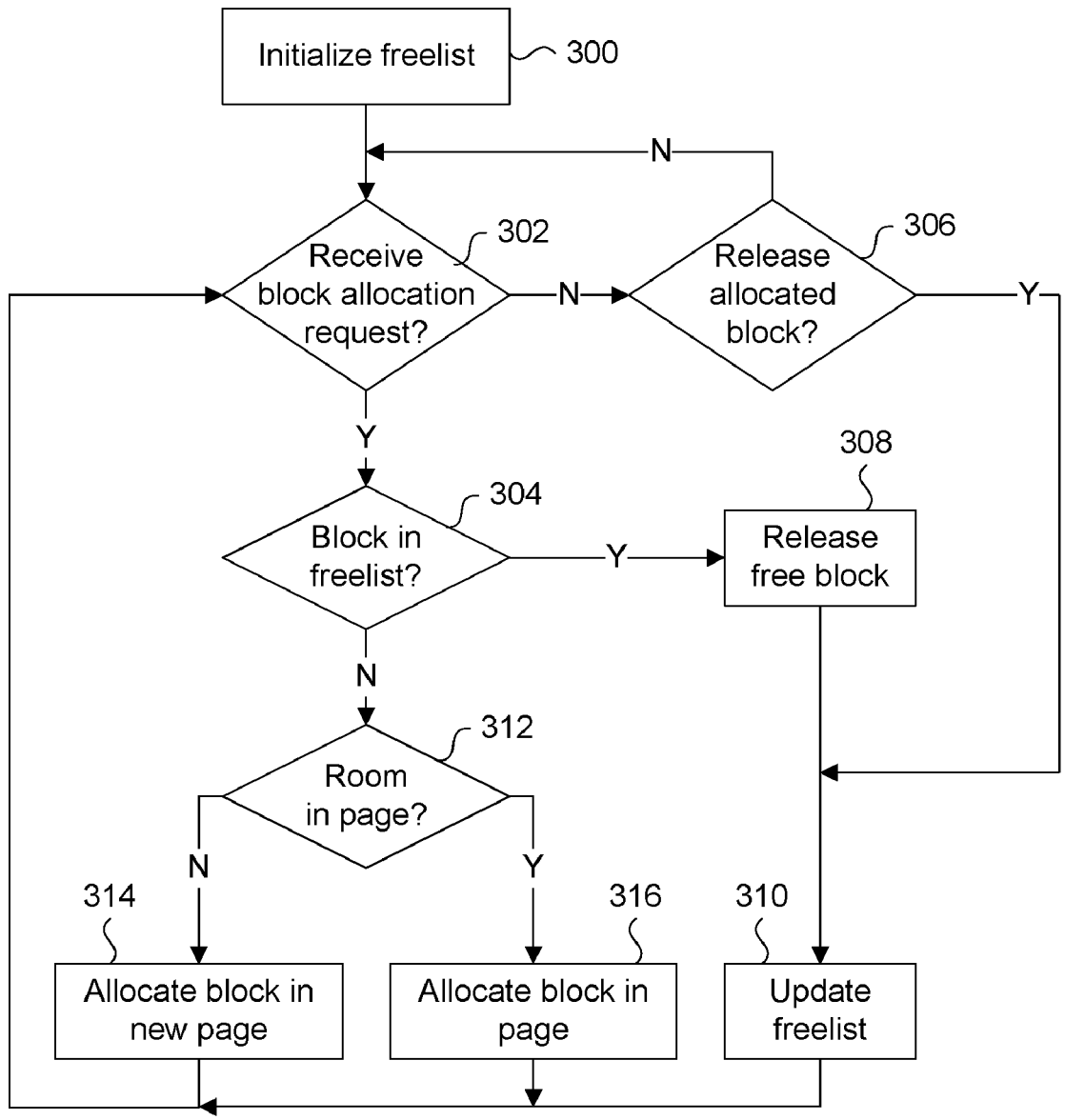
FIG. 6 is a flow chart of a method for allocating header-less dynamic memory blocks, according to a present embodiment.

FIG. 6 is a flow chart of a method exemplifying an embodiment of the algorithm for managing the allocation of memory blocks and the freelist, in response to a request for memory and an instruction for releasing an allocated memory block. While the small block manager 208 can execute other algorithms of a standard memory manager, only the algorithm above will be described. The header-less dynamic memory allocation algorithm starts after the application has been initiated, and it is assumed that one page of memory is initially available for use.

At step 300, a particular freelist profile is initialized corresponding to the application and/or task, and a memory page is allocated. A pointer to the allocated memory page will be stored in page root 192 of freelist 182, and null pointers are stored in the block roots of freelist 182. The algorithm waits until a memory block request less than or equal to the predetermined threshold is received at step 302, and then proceeds to step 304. This can be referred to as a valid request. Otherwise, if the memory request is greater than the predetermined threshold, one of the standard dynamic memory allocation schemes is used. If an instruction to release a memory block is received, then the algorithm proceeds to step 306. It is noted that a memory release operation can include releasing a memory block or a memory page. If neither a memory request or memory release operation is received, then the algorithm loops back to step 302. Returning to the case where a memory block request is received at step 302, if the memory request is for a specific number of bytes, the small block manager 208 can assign the smallest fixed size memory block having a size at least that of the memory request. A determination is made at step 304 to check if there is a free memory block having the same size in the freelist. This is done by looking up the corresponding block root in the freelist and reading the stored pointer. If the block root stores the null pointer, then there is no free memory block of the requested memory block size. On the otherhand, if the block root stores a root pointer, then a correspondingly sized free block is available.

In the case that a free memory block is available, the algorithm proceeds to step 308 to allocate the free memory block to the application. In other words, the free memory block is re-allocated to the application. Then the freelist is updated at step 310 to reflect the removal of the free memory block from the freelist. In the event that a free memory block is not available, the algorithm proceeds to step 312 to check if there is sufficient room left in the page for allocating the requested fixed size memory block. If there is insufficient room left in the current page, then a new page is allocated in step 314, and the requested fixed size memory block is allocated to the application. When the new memory page is allocated, the root page in the freelist can be updated in the manner previously described for keeping track of the allocated memory pages. Otherwise, the requested fixed size memory block is allocated to the current page in step 316. It is noted that the freelist is shared amongst any number of memory pages, and those skilled in the art will understand that any pointer can include hierarchical information relating to the page a particular memory block resides in. Allocation of the memory block is achieved by returning a pointer to the beginning of the block to the application. Returning to step 306, if an instruction for releasing a memory block is received, then the freelist is simply updated at step 310. If an instruction for releasing a memory page is received, then the previously described page release algorithm can be executed. Further details regarding the freelist update algorithm will be described later. Following steps 310, 314 and 316, the algorithm loops back to step 302 for the subsequent memory request or memory release operation.

Details of the freelist management algorithm embodiment is now discussed. There are two sub processes executed by the algorithm, which can both be executed by the freelist manager 214 in FIG. 5. One is the memory block link algorithm and the other is the memory block re-allocation algorithm. The memory block link algorithm is responsible for keeping track of every fixed size memory block released by the application. The memory block re-allocation algorithm is responsible for allocating one of these released memory blocks to the application.

Figure 7:
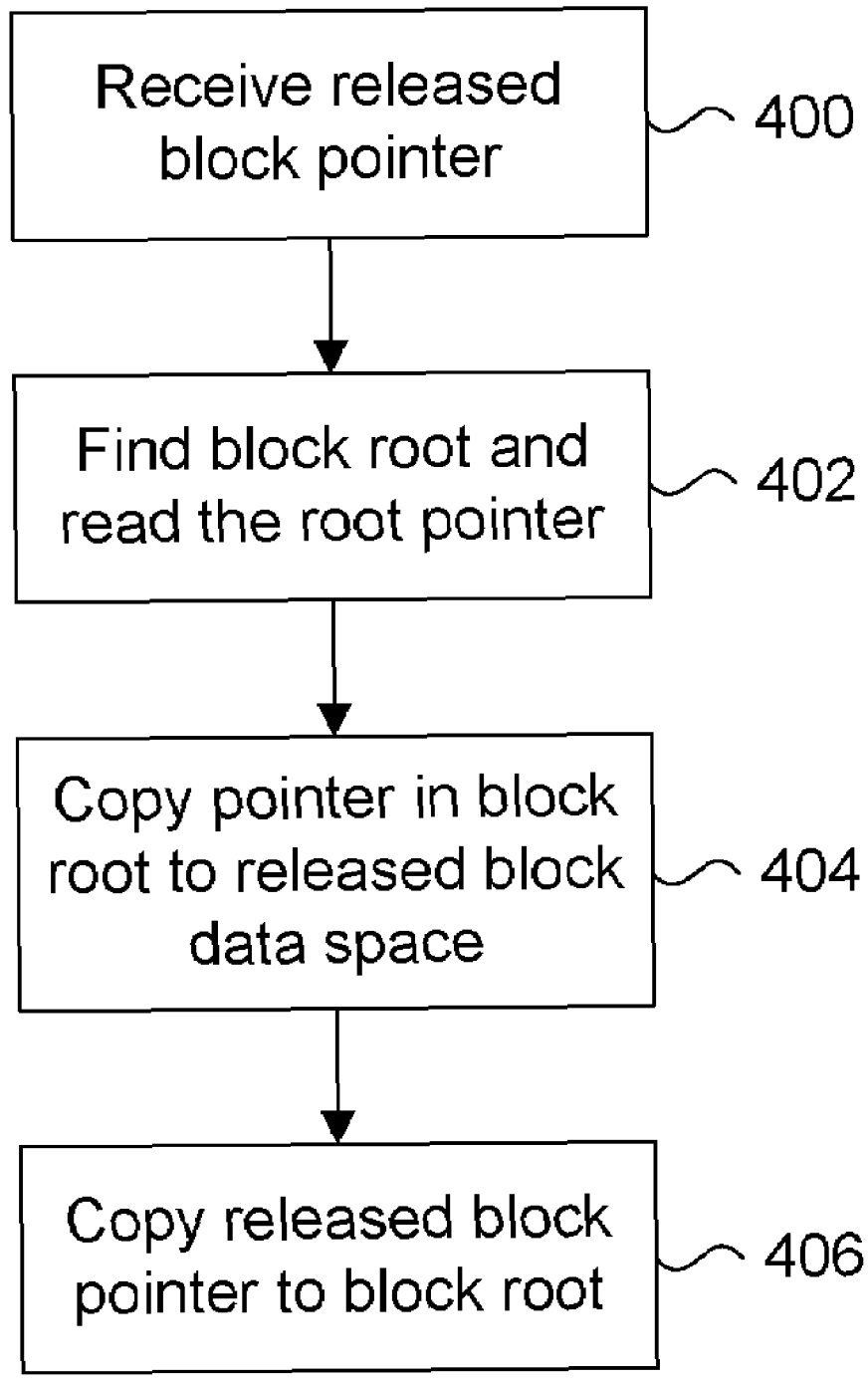
FIG. 7 is a flow chart of a method for adding free blocks to a freelist, according to a present embodiment.
Figure 8A:
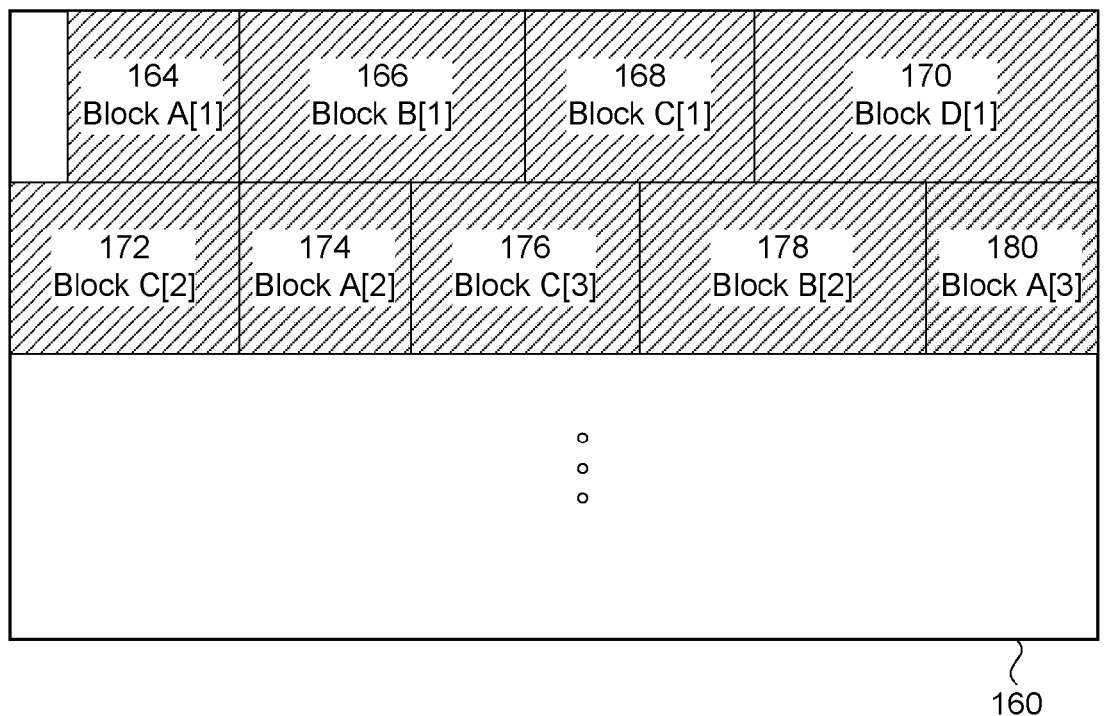
FIGS. 8*a* to 8*d* are illustrations of the structure of a memory page and a freelist after execution of steps of the method shown in FIG. 7.
Figure 8B:
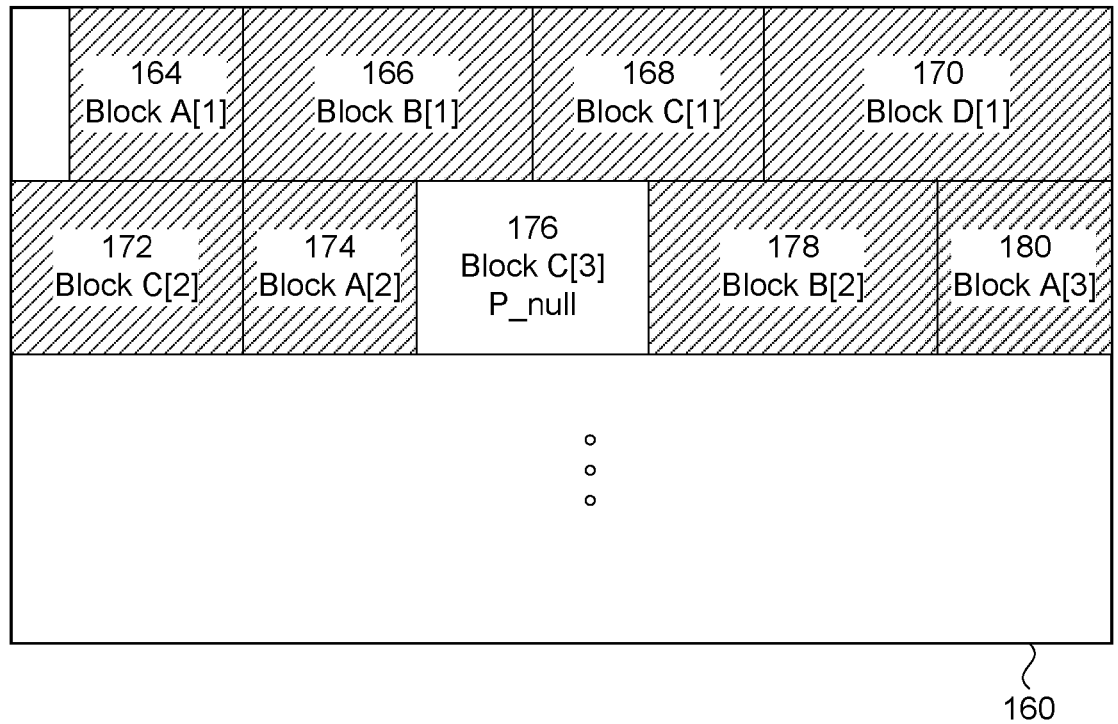
Figure 8B:
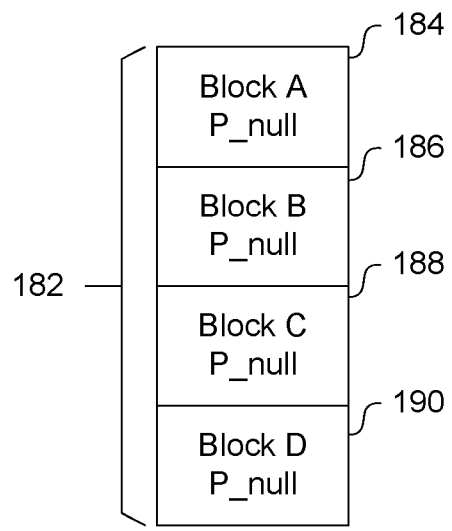
Figure 8C:
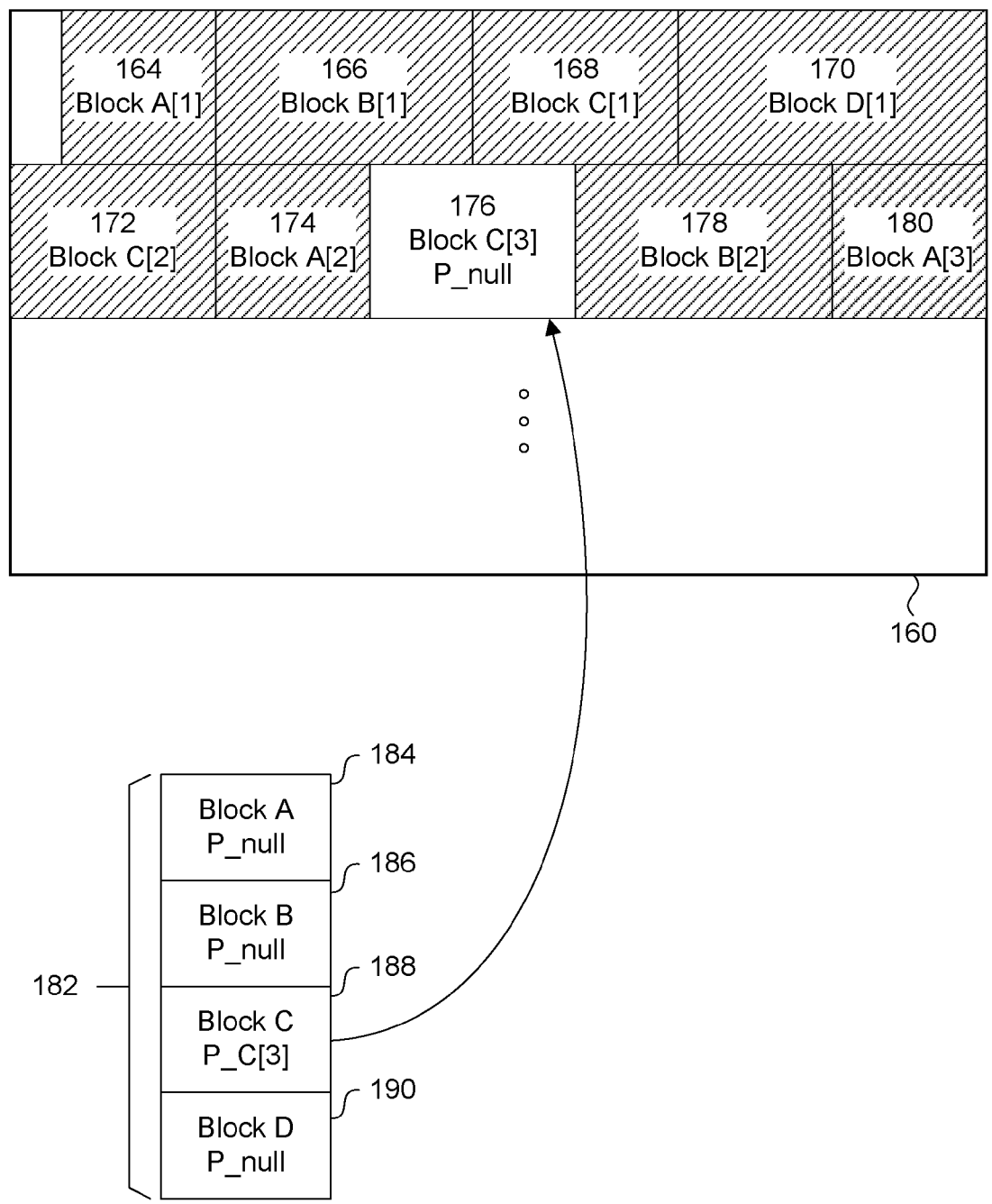

FIG. 7 is a flow chart of a method exemplifying an embodiment of the memory block link algorithm. FIGS. 8a to 8c are accompanying examples of the structure of memory page 160 and freelist 182 of FIG. 4 in different states, after steps of the algorithm of FIG. 7 have been executed. In the following examples of the structure of memory page 160 and freelist 182, it is assumed that only one memory page is being used, and hence it is not necessary to show page root 192 in freelist 182. It will be assumed that page root 192 will store a root page pointer to memory page 160. In this example, the application will release block 176. It is assumed that freelist 182 has been initialized and includes null pointers, and memory page 160 has the allocated block structure as shown in FIG. 8a. All memory blocks 164 to 180 have been allocated.

As the application executes its operations, it can release a fixed size memory block. This is done by releasing the corresponding pointer to the beginning of the block to freelist manager 214. As discussed earlier, the application will have stored block size information corresponding to the particular pointer. Hence when a specific pointer is released, this size information is provided to the freelist manager 214. The algorithm starts at step 400 when the freelist manager receives the memory block pointer (P_C[3]) for memory block 176. Following at step 402, the block root corresponding to the size of the released memory block pointer is identified and the pointer stored therein is read. The released memory block can be mapped to the corresponding block root through a variety of known techniques. For example, a hash table associating a particular memory block size with a block root can be used. Alternately, a linear search where all the block roots are sequentially searched for a value corresponding to the desired block size can be executed. Those skilled in the art will understand that other search techniques can be used with equal effectiveness.

As previously mentioned, the pointer can be either a root pointer or a null pointer. The freelist manager 214 will have associated the released block pointer P_C[3] to a fixed size memory block, that is, a Block C size. Therefore, corresponding block root 188 for Block C size is identified and null pointer P_null stored therein is read. At step 404, the null pointer (or root pointer) in the block root is copied into the presently released free block space. As shown in FIG. 8b, null pointer P_null is copied into memory block 176 after step 404 is executed. Then at step 406, the pointer P_C[3] of the presently released memory block 176 is copied into the block root 188. After step 406, memory block 176 is added to the freelist 182, since block root 188 now stores the pointer to it. FIG. 8c shows the new link between the freelist 182 and free memory block 176.

Figure 8D:
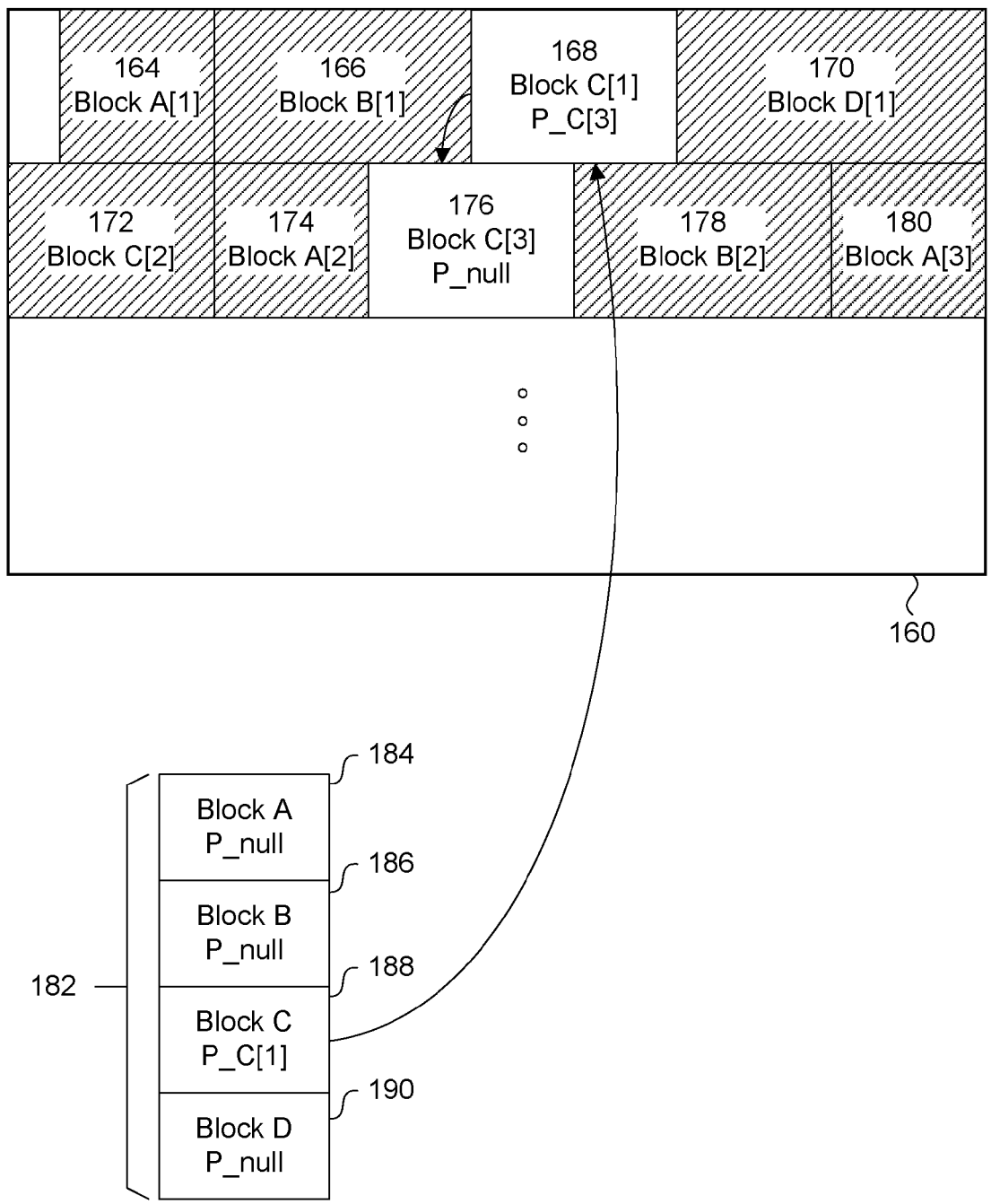

According to the present algorithm, all released memory blocks are added to the head of the list. The head of the list is the first free memory block pointed to by the root pointer. For example, if the application subsequently releases memory block 168, steps 400 to 406 are repeated, resulting in the structure of memory page 160 as shown in FIG. 8d. In FIG. 8d, memory block 168 is pointed to by the root pointer in block root 188 while memory block 168 stores the branch pointer to the other free memory block 176. Memory block 176 stores the null pointer to indicate that there are no further free memory blocks for this fixed size memory block. Therefore, the freed memory block space in memory page 160 is effectively re-used for storing pointer information. In other embodiments, however, other methods may be used for adding the block to the list. For example, the block could be added as the last element of the list.

While the previously discussed embodiment presumes that the application stores block size information for requested memory blocks, certain applications do not have to store such information and can instead infer the size of the memory blocks from application specific information. For example, if the YK compression algorithm uses 6 byte memory block units, and a pattern appears 8 times, the application will have allocated 8 blocks for a total of 48 bytes. The YK algorithm keeps the information in these 8 blocks sorted in order to facilitate a binary search to find the information it needs. To perform a binary search, the application will need to know the number of blocks to search. Therefore, the number of blocks will be stored. Hence if there are a total of 48 bytes stored for a pattern and 8 blocks allocated, then the application can infer that the block is 6 bytes in size. This is one possible method of inferring block size, and every application may have a unique method specific to the way it uses the memory. In either case, the application is able to provide information relating to the size of the memory block to be released.

The free memory block link algorithm shown in FIG. 7 and the examples shown in FIGS. 8a to 8c illustrate how released memory blocks can be tracked using any number of pointers, without needing to allocate storage space for the freelist. To minimize fragmentation of memory page 160, the memory blocks in freelist 182 can be re-allocated to the application using the memory block re-allocation algorithm. Although root page 192 does not track released memory pages, updating the linked list of memory pages as they are allocated would follow the same algorithm shown in FIG. 7.

Figure 9:
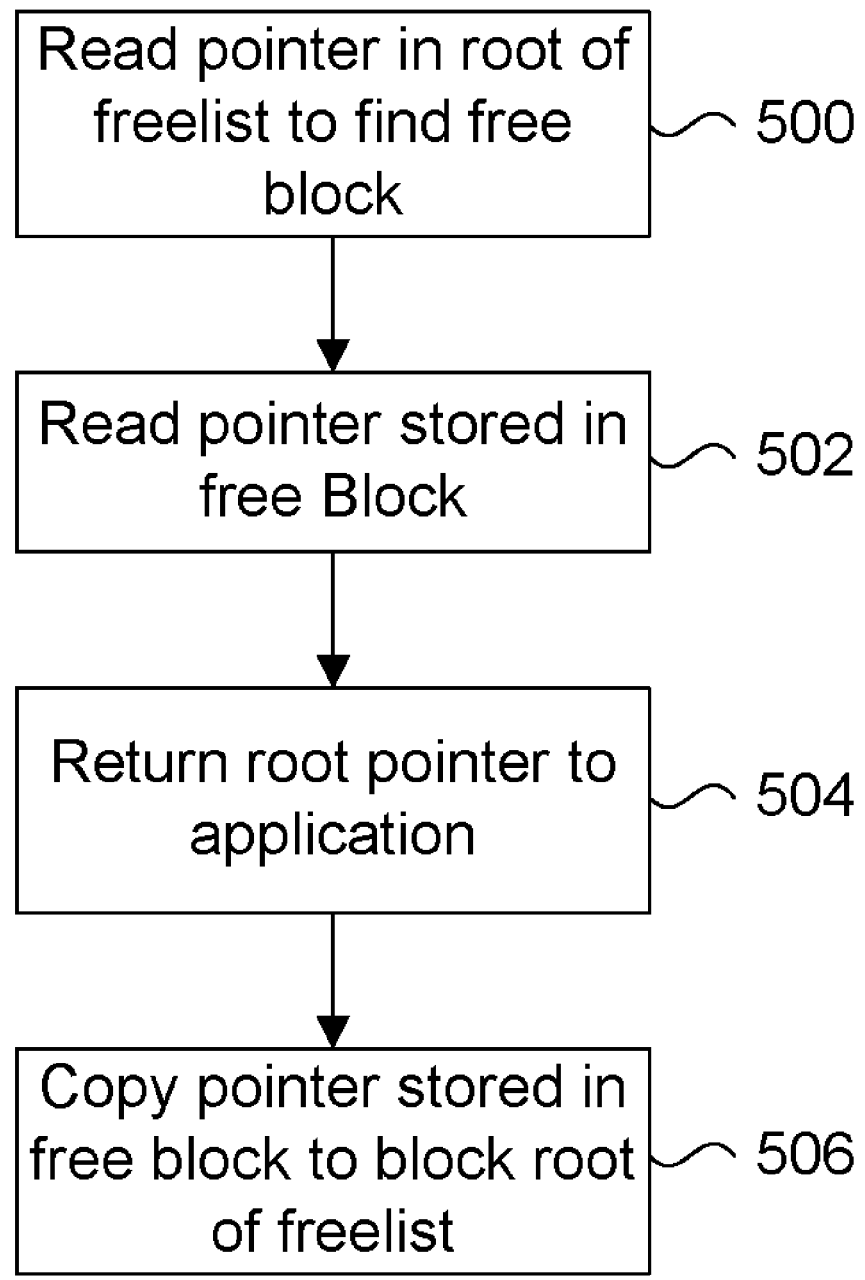
FIG. 9 is a flow chart of a method for removing free blocks from a freelist, according to a present embodiment; and, FIGS. 10*a* to 10*c* are illustrations of the structure of a memory page and a freelist after execution of steps of the method shown in FIG. 9.
Figure 10A:
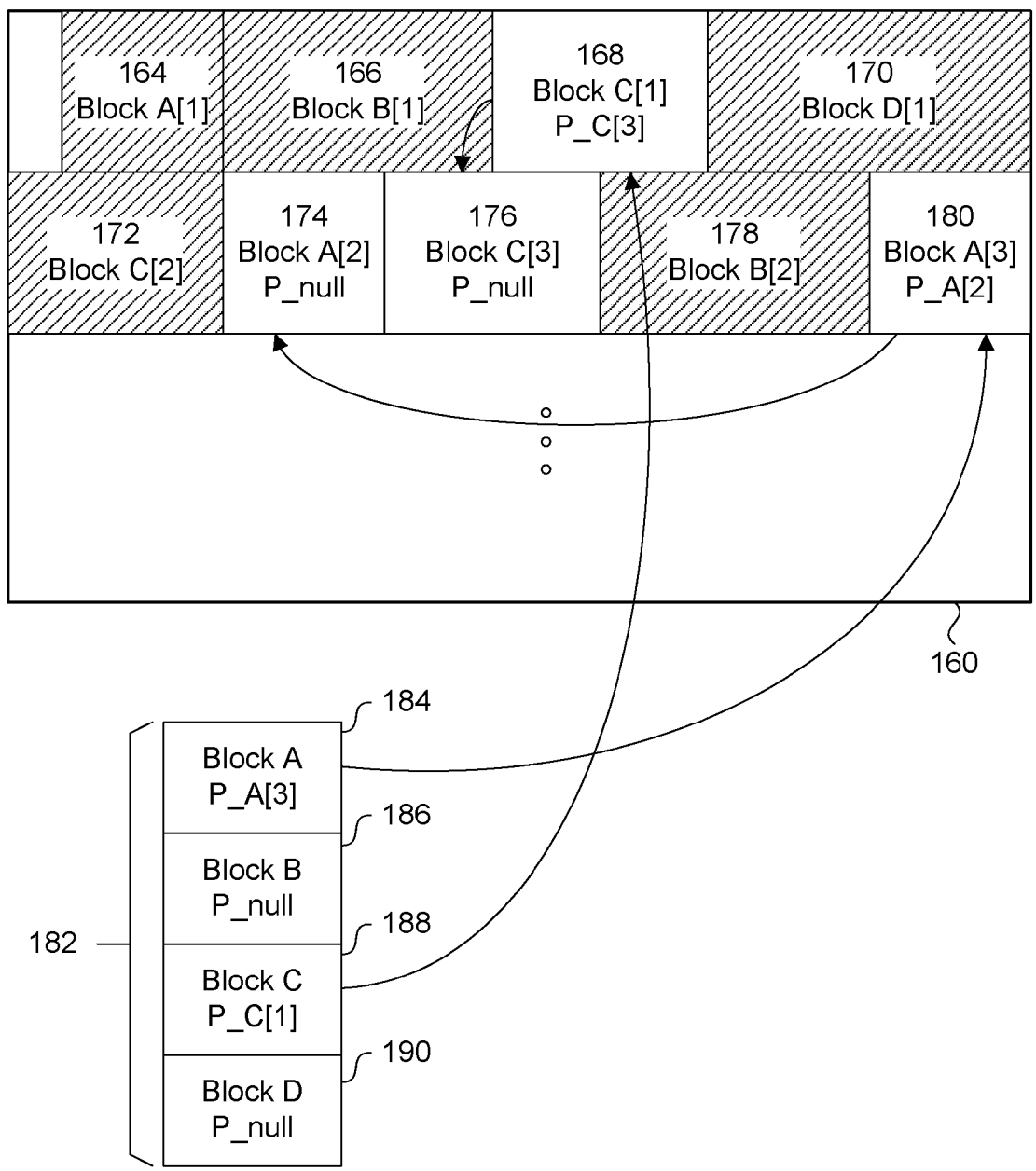
Figure 10B:
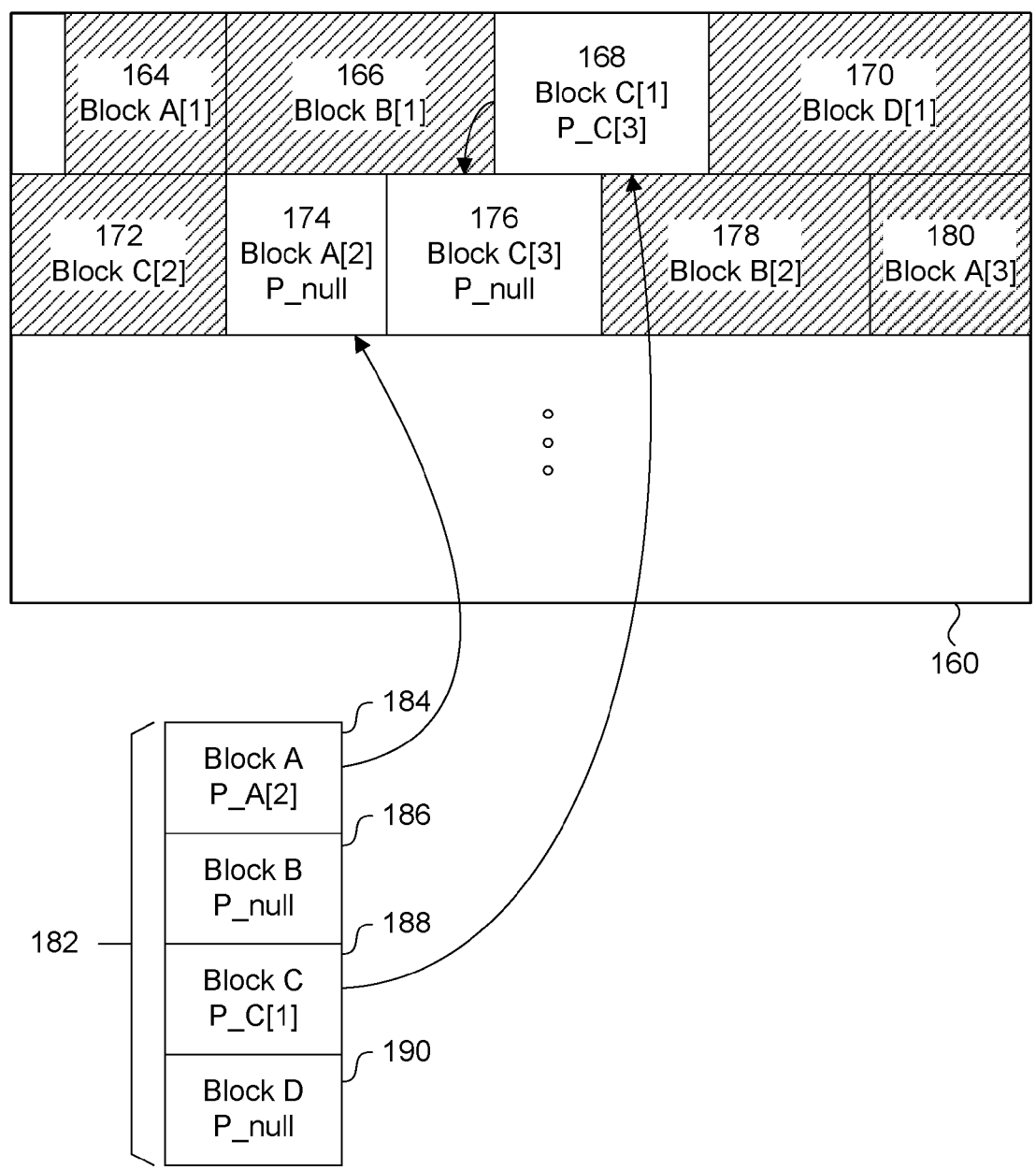
Figure 10C:
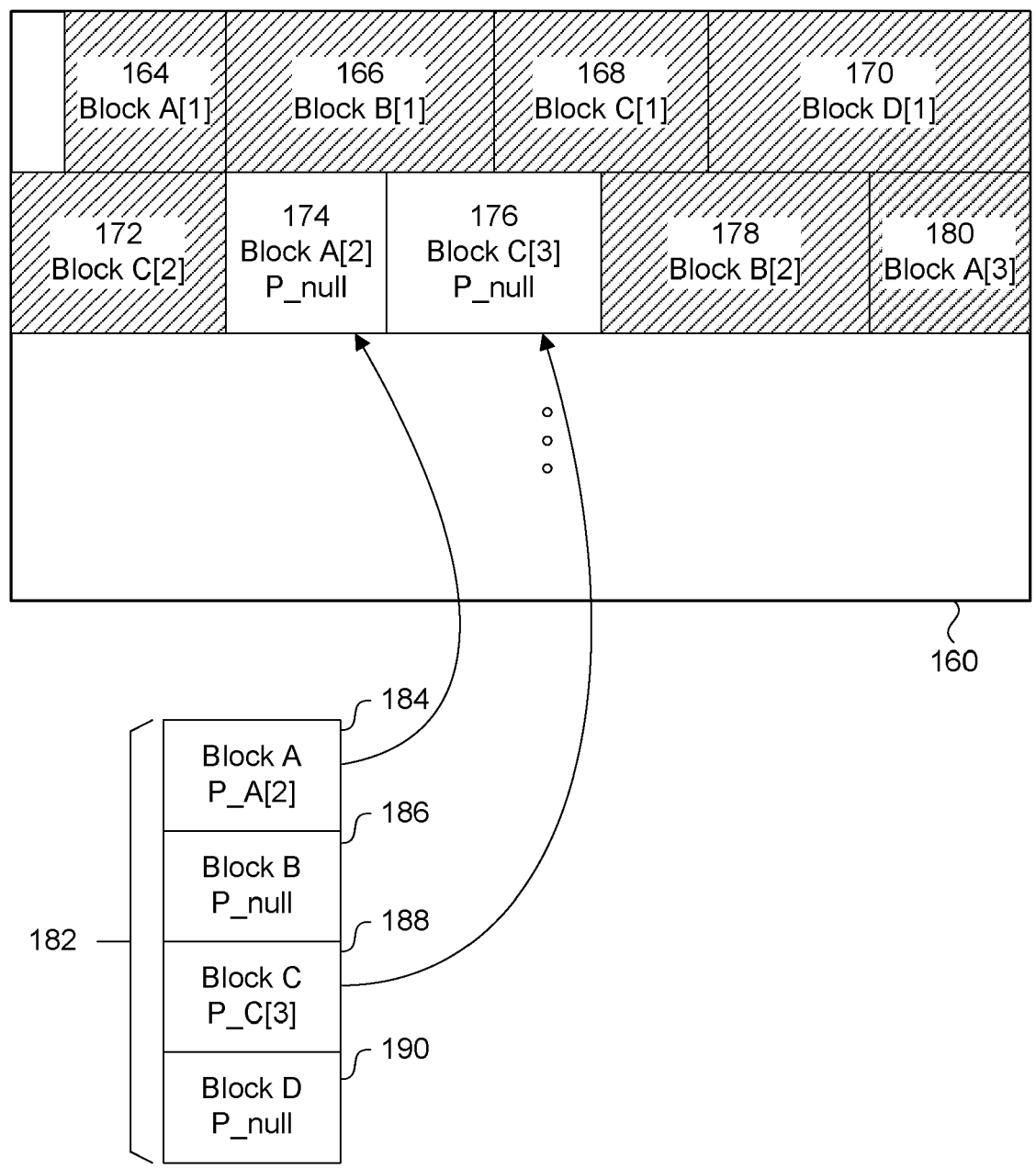

FIG. 9 is a flow chart of a method exemplifying an embodiment of the memory block re-allocation algorithm. FIGS. 10a to 10c are accompanying examples of the structure of memory page 160 and freelist 182 of FIG. 4 in different states, after steps of the algorithm of FIG. 9 have been executed. In the present example, it is assumed that memory page 160 and freelist 182 have the structure shown in FIG. 10a.

The application can request memory blocks having the same fixed size any number of times during its lifetime. When the small block manager 208 receives the memory request, the freelist manager 214 is tasked with checking the freelist to see if there is a same fixed size memory block in freelist 182. In the present example, the application requests a memory block having a Block A size. In step 500 of the algorithm, the corresponding block root 184 for Block A is identified and its pointer is read. Block root 184 stores root pointer P_A[3] pointing to free memory block 180. At step 502, the branch pointer P_A[2] stored in memory block 180 is read, and the root pointer P_A[3] is returned to the application at step 504. Now branch pointer P_A[2] is copied to block root 184 at step 506, resulting in the memory page and freelist structure shown in FIG. 10b.

If a memory block having a Block C size is subsequently requested by the application, then steps 500 to 506 are repeated. The free memory block at the head of the list, that being memory block 168, is re-allocated to the application. Now block root 188 stores pointer P_C[3], which was the next free block in the list. The resulting structure of memory page 160 and freelist 182 is shown in FIG. 10c.

As shown in the previously described embodiments and illustrated by the shown examples, the dynamic memory allocation algorithm of FIG. 6 will provide a memory page allocation structure in which only data is stored in the memory page 160. The freelist management algorithms ensure that memory page utilization is maximized by maintaining a list of fixed size memory blocks that have been freed, and re-allocating the freed fixed size memory blocks. Once the application has completed its task, the memory page(s) and the allocated memory for the freelist can be released to the system.

To validate the effectiveness of the presently described header-less dynamic memory allocation architecture, the dynamic memory usage and overall memory usage of a memory device has been compared to that of the buddy heap memory allocation scheme. When the same page of text is compressed with the YK compression algorithm, the static heap memory and transient heap memory in both schemes are substantially the same. However, the dynamic memory used by the header-less dynamic memory allocation architecture is about half the amount used by the buddy heap scheme.

In the preceding description, for purposes of explanation, numerous details are set forth in order to provide a thorough understanding of the embodiments of the dynamic memory allocation system and method. However, it will be apparent to one skilled in the art that these specific details are not required in order to practice these embodiments. In other instances, well-known electrical structures and circuits are shown in block diagram form in order not to obscure the embodiments. For example, specific details are not provided as to whether the embodiments described herein are implemented as a software routine, hardware circuit, firmware, or a combination thereof.

Embodiments of the dynamic memory allocation method can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment. Those of ordinary skill in the art will appreciate that other instructions and operations necessary to implement the described embodiments can also be stored on the machine-readable medium. Software running from the machine-readable medium can interface with circuitry to perform the described tasks.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

The above-described embodiments are intended to be examples only. Alterations, modifications and variations can be effected to the particular embodiments by those of skill in the art without departing from the scope of the invention, which is defined solely by the claims appended hereto.

What is claimed is:

1. A memory allocation system comprising:
   a memory having a page for storing data; and,
   a small block memory manager for allocating a plurality of fixed size memory blocks free of header information in the page in response to an application request for memory less than or equal to a maximum block size,
   the small block memory manager maintaining a freelist of fixed block sizes up to the maximum block size and having a freelist manager for maintaining the freelist, the freelist having block roots corresponding to each of the plurality of fixed size memory blocks and a page root pointer for storing a root page pointer pointing to the page, the freelist manager linking free memory blocks having a common size to one corresponding block root, the free memory blocks corresponding to released fixed size memory blocks having the common size.

2. The memory allocation system of claim 1, further including a large block memory manager for allocating memory in the page according to a standard memory allocation scheme in response to the application request for memory greater than the maximum block size.

3. The memory allocation system of claim 2, further including a block request arbitrator selectively providing the application request for memory to one of the small block memory manager and the large block memory manager in response to a size of requested memory.

4. The memory allocation system of claim 1, wherein the one corresponding block root stores one of a null pointer and root pointer to one of the free memory blocks.

5. The memory allocation system of claim 4, wherein each of the free memory blocks stores one of the null pointer and a branch pointer to another of the free memory blocks.

6. The memory allocation system of claim 1, wherein the standard memory allocation scheme includes one of a heap-based allocation scheme, a fixed-sized block allocation scheme and a buddy-block allocation scheme.

7. The memory allocation system of claim 1, wherein the maximum block size is dynamically set by the application for a specific task.

8. The memory allocation system of claim 1, wherein each size of the plurality of fixed size memory blocks is set by the application.

9. The memory allocation system of claim 1, wherein the maximum block size is set to correspond to the application.

10. The memory allocation system of claim 1, wherein the page stores one of a null pointer or a branch pointer to another page.

11. A method for dynamic allocation of memory in a page comprising:
   a) initializing a freelist having a plurality of block roots each corresponding to a plurality of fixed size memory blocks and a page root, and allocating the page and storing in the page root a root page pointer to the page;
   b) receiving a request for memory of a predetermined size; and,
   c) allocating a memory block having a size corresponding to one of the plurality of fixed size memory blocks in the page if the predetermined size is less than or equal to a largest fixed size block of the plurality of fixed size blocks.

12. The method for allocating memory of claim 11, further including a step of allocating memory having at least the predetermined size if the predetermined size is greater than the largest fixed size block of the plurality of fixed size blocks.

13. The method for allocating memory of claim 11, wherein the step of initializing includes storing a null pointer value in each of the plurality of block roots.

14. The method for allocating memory of claim 11, further including allocating a new page and storing a branch pointer pointing to the new page in the page root, and storing the root page pointer in the new page.

15. The method for allocating memory of claim 14, further including releasing the new page and updating the page root to include the root page pointer.

16. The method for allocating memory of claim 11, wherein the predetermined size corresponds to one of the plurality of fixed size memory blocks.

17. The method for allocating memory of claim 11, wherein the predetermined size is a specific number of bytes.

18. The method for allocating memory of claim 17, wherein the memory block corresponds to a smallest sized memory block of the plurality of fixed sized memory blocks having at least the predetermined size.

19. The method for allocating memory of claim 18, wherein the step of allocating a memory block includes allocating a new page if there is insufficient room in the page for the new block, and allocating the memory block from the new page.

20. The method for allocating memory of claim 11, further including releasing at least one previously allocated memory block as a free memory block, and adding said free memory block to the freelist.

21. The method for allocating memory of claim 20, wherein the step of releasing the at least one previously allocated memory block includes
   i) receiving a block pointer corresponding to the free memory block,
   ii) copying a pointer stored in one of the plurality of block roots to the free memory block, and
   iii) copying the block pointer to the one of the plurality of block roots.

22. The method for allocating memory of claim 21, wherein the pointer includes one of a root pointer pointing to a second free block and a null pointer.

23. The method for allocating memory of claim 22, wherein the step of allocating the memory block includes allocating the free memory block.

24. The method for allocating memory of claim 23, wherein allocating the free memory block includes
   i) reading the block pointer stored in the one of the plurality of block roots,
   ii) providing the block pointer to the application,
   iii) reading the pointer stored in the free memory block, and
   iv) copying the pointer into the one of the plurality of block roots.

25. A memory allocation architecture, comprising
   a memory page storing a first pointer and subdividable into differently fixed size memory blocks free of header information in response to a memory request, each of the differently fixed size memory blocks storing one of application data and a second pointer; and,
   a freelist containing a plurality of block roots and a page root for storing a page root pointer pointing to the memory page, each of the plurality of block roots corresponding to one of the differently fixed size memory blocks, each of the plurality of block roots storing one of a null pointer and a third pointer pointing to one fixed size memory block storing the second pointer.

26. The memory allocation architecture of claim 25, wherein the second pointer can include the null pointer or a branch pointer, the branch pointer pointing to one other fixed size memory block storing another branch pointer, the one other fixed size memory block being the same size as the one fixed size memory block.

27. The memory allocation architecture of claim 25, wherein the one fixed size memory block and the one other fixed size memory block are free memory blocks.

28. The memory allocation architecture of claim 25, wherein the first pointer can include a null pointer or a branch pointer, the branch pointer pointing to another memory page.

29. A method for dynamic allocation of memory in a page comprising:
   a) initializing a freelist having a plurality of block roots each corresponding to a plurality of fixed size memory blocks;
   b) receiving a request for memory of a predetermined size; and,
   c) allocating a memory block having a size corresponding to one of the plurality of fixed size memory blocks in the page if the predetermined size is less than or equal to a largest fixed size block of the plurality of fixed size blocks
   d) releasing at least one previously allocated memory block as a free memory block, and adding said free memory block to the freelist by receiving a block pointer corresponding to the free memory block, copying a pointer stored in one of the plurality of block roots to the free memory block, and copying the block pointer to the one of the plurality of block roots.

* * * * *